March 27, 1928. 1,664,179
G. MANGIARACINA
SAFETY DEVICE FOR GAS METERS
Filed June 17, 1926
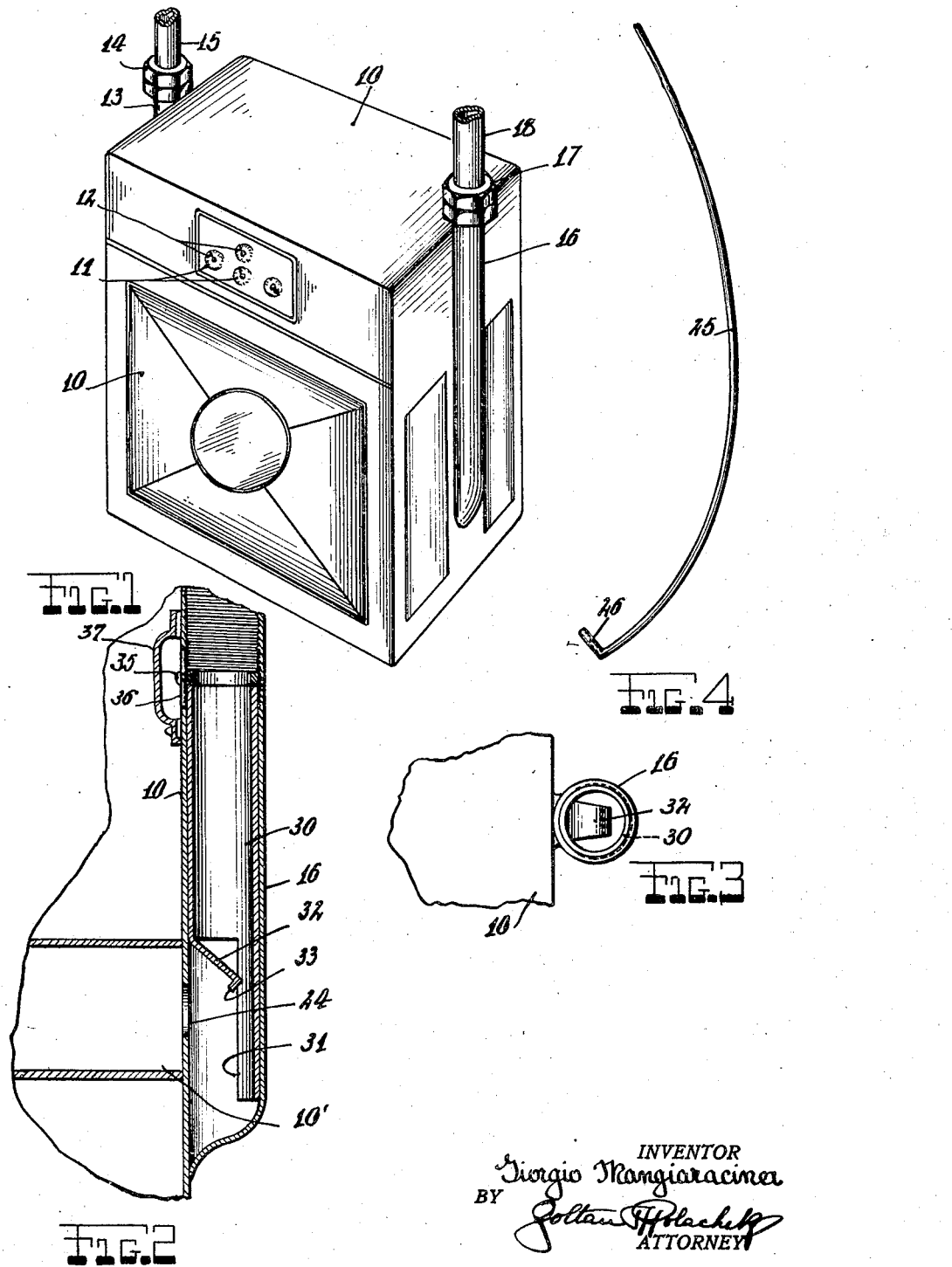
INVENTOR
Giorgio Mangiaracina
BY
ATTORNEY Patented Mar. 27, 1928.

1,664,179

UNITED STATES PATENT OFFICE.

GIORGIO MANGIARACINA, OF BROOKLYN, NEW YORK.

SAFETY DEVICE FOR GAS METERS.

Application filed June 17, 1926. Serial No. 116,525.

This invention relates generally to gas meters used to record the amount of gas used or consumed, the invention having more particular reference to a novel type of improvement for gas meters embodying a means of preventing the use of gas through a gas meter without recording the amount of gas used.

The invention has for an object the provision of an improved device of the class described, of simple, novel construction, cheaply manufactured and effective.

For further comprehension of the invention, and of the objects and advantages thereof, reference will be had to the following description and accompanying drawings, and to the appended claims in which the various novel features of the invention are more particularly set forth.

Fig. 1 of the drawings, is a perspective view of a gas meter embodying my improved device.

Fig. 2 is an enlarged fragmentary sectional view thereof.

Fig. 3 is a top plan view of my improved device as attached to the gas meter.

Fig. 4 is a side elevational view of the instrument such as commonly used to incapacitate the said gas meter.

The gas meter 10 is of ordinary construction and design, such as generally used, and is provided with recording dials 11 and indicators 12, such as commonly used to record or register the amount or quantity of gas used. The inlet 13 is connected to the gas meter 10, and is also connected by means of the coupling 14 to the pipe 15, which is connected to a gas main or any suitable source of gas supply, not illustrated in the accompanying drawings. The outlet 16 is connected to the gas meter 10, and is also connected by means of the coupling 17 to the pipe 18, which is connected to any desired gas jet or plurality of gas jets such as commonly used for lighting, heating, cooking or wherever gas is used.

It is common knowledge that gas meters are constructed with certain apparatus to record the amount of gas flowing therethrough, and that this apparatus includes certain valves. If these valves are forced open by means foreign to the meter, an escape for the gas directly from the inlet to the outlet is afforded, without the proper registering of the meter. It is also common knowledge that certain means may be inserted through the meter's gas outlet for forcing these valves open.

By disconnecting the outlet 16, by detaching the coupling 17, the instrument 25, consisting of an elongated flexible member, wire or the like, having a bent extremity 26, may be inserted in the outlet 16, so that the bent extremity 26 will pass through the aperture 24, and be forced or pressed against certain valves as before explained, not shown on the drawing, which are positioned in the usual valve chamber 10' so as to prevent the gas meter 10 from recording the amount of gas used. It should be understood that the outlet 16 is connected to the pipe 18, by attaching the coupling 17 after the wire has been inserted as just described.

As here embodied my improved device, for preventing the incapacitating of the said gas meter, comprises a tubular member 30, adapted to be slidably engaged or inserted in the outlet 16 of the said gas meter, and is provided with a notched extremity 31. The notched extremity of the tubular member 30 is located in close proximity to the outlet passage 24, and the side portion of said tubular member is slotted and disposed or bent inwardly between the slots on top of the outlet opening 24 forming a baffle 32 which extends diagonally substantially across the cylindrical passage of the tubular member 30. As shown in Figure 3, this baffle is narrower than the passage in the tubular member 30 and thus provides sufficient space for the passage of gas, but prevents the insertion of a wire member for the purpose disclosed above. The lower end section 31 of the tubular member is adapted to recline adjacent the inner surface of the tube 16. A projection 33 is provided on the lower extremity of the baffle 32 and is disposed substantially at right angles to the plane of the baffle member. This projection is thus directed to direct inserted wires to a point below the outlet opening 24, and is adapted thus, to prevent insertion of the wire into the outlet opening 24 through the space between the extremity of the baffle 30 and the tubular member.

The collar 34, washer or the like, removably attached to the outlet 16, by threads or the like, is positioned inside the outlet 16 above the tubular member, and has removably attached thereto, a screw 35, extending therefrom through an elongated slot 36 in the side of the gas meter 10. A cover plate 37 is secured to the inside of the meter and over the slot 36 so as to prevent the leakage of gas through the slot. The above described construction being such as will prevent the removal of the tubular member 30, when the coupling 17 is detached, and which will also permit the tubular member 17 to be lowered as may be desired, which will obviously increase the effectiveness and efficiency of my improved device.

The device presents a novel feature in that it may be readily inserted in any old meter not provided with a baffling device, operated by a user that the gas company suspects is tampering with the meter. It is only necessary to drop the device in pipe 16, apply screw 35 as described, and the device is installed.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

1. In a device of the class described, the combination with a gas meter having a side gas outlet opening into a gas outlet connection, of a tubular member having spaced slots therein, at the bottom thereof, and adapted to be inserted in the said outlet connection, the side portion of said tubular member between said slots being disposed inwardly and extended substantially across the passage therein, and positioned in front of the said side outlet for preventing the insertion of a wire into the said outlet.

2. In a device of the class described, the combination with a gas meter having a side gas outlet opening into a gas outlet connection, of a tubular member having spaced slots therein, at the bottom thereof, and adapted to be inserted in the said outlet connection, the side portion of said tubular member between said slots being disposed inwardly and extended substantially across the passage therein, and positioned in front of the said side outlet for preventing the insertion of a wire into the said outlet, and means controlled from the inside of the meter for preventing the removal of the tubular member from the outlet passage of the meter.

3. In a device of the class described, the combination with a gas meter having a side gas outlet opening into a gas outlet connection, of a tubular member having spaced slots therein, at the bottom thereof, and adapted to be inserted in the said outlet connection, the side portion of said tubular member between said slots being disposed inwardly and extended substantially across the passage therein, and positioned in front of the said side outlet for preventing the insertion of a wire into the said outlet, a flange projecting from and at right angles to the said inwardly disposed side portion directed to direct wires inserted into the tubular member to a point below the said side gas outlet opening, and means controlled from the inside of the meter for preventing the removal of the tubular member from the outlet passage of the meter.

In testimony whereof I have affixed my signature.

GIORGIO MANGIARACINA.